United States Patent
Priddle et al.

(10) Patent No.: US 11,553,154 B2
(45) Date of Patent: *Jan. 10, 2023

(54) METHOD AND ARRANGEMENT FOR SUPPORTING PLAYOUT OF CONTENT

(71) Applicant: Telefonaktiebolaget LM Ericsson (publ), Stockholm (SE)

(72) Inventors: Clinton Priddle, Carindale (AU); Per Fröjdh, Stockholm (SE); Thorsten Lohmar, Aachen (DE); Zhuangfei Wu, Danderyd (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/205,827

(22) Filed: Mar. 18, 2021

(65) Prior Publication Data

US 2021/0211606 A1    Jul. 8, 2021

Related U.S. Application Data

(63) Continuation of application No. 15/976,192, filed on May 10, 2018, now Pat. No. 10,958,867, which is a
(Continued)

(30) Foreign Application Priority Data

Jan. 13, 2011    (WO) ............... PCT/SE2011/050033

(51) Int. Cl.
*H04N 5/783*    (2006.01)
*H04N 21/2387*  (2011.01)
(Continued)

(52) U.S. Cl.
CPC ......... *H04N 5/783* (2013.01); *H04L 65/1059* (2013.01); *H04L 65/764* (2022.05);
(Continued)

(58) Field of Classification Search
CPC .............. H04N 5/783; H04N 21/2387; H04N 21/25833; H04N 21/4516; H04N 21/454;
(Continued)

(56) References Cited

U.S. PATENT DOCUMENTS 6,215,326 B1    4/2001    Jefferson et al.
6,871,006 B1    3/2005    Oguz et al.
(Continued)

FOREIGN PATENT DOCUMENTS

CN    101075949 A    11/2007
JP    2001092706 A    4/2001
(Continued)

OTHER PUBLICATIONS

3rd Generation Partnership Program, Source: Telefon AB LM Ericsson, ST-Ericsson SA, "Trick Play in HTTP Streaming", S4-AHI152, TSG-SA4#6-SWG on HTTP Streaming, Mar. 2-4, 2010, Aachen, Germany.
(Continued)

*Primary Examiner* — Michael Won
(74) *Attorney, Agent, or Firm* — Coats & Bennett, PLLC

(57) ABSTRACT

Methods and arrangements in a client node and a server node support a decision on decoding and playout of a certain content in the client node. The methods and arrangements relate to the determining, conveying and obtaining of information related to the characteristics (level) required for decoding and playing out the certain media content at a non-regular playout rate. The method and arrangement in the client node further relate to determining, based on the obtained information, which playout rate(s) is/are supported by the client node in regard of level. The methods and arrangements enable the client node to refrain from attempt-
(Continued)

| Speed up | Required level |
|---|---|
| 1x | 1.1 |
| 10x | 1.1 |
| 20x | 1.2 |
| 30x | 1.3 | ing to decode and play out of the content at a non-regular rate requiring a level which is not supported by the client node.

6 Claims, 8 Drawing Sheets

Related U.S. Application Data continuation of application No. 13/007,890, filed on Jan. 17, 2011, now Pat. No. 9,979,925.

(60) Provisional application No. 61/295,958, filed on Jan. 18, 2010.

(51) Int. Cl.
| | | |
|---|---|---|
| *H04N 21/258* | (2011.01) | |
| *H04N 21/45* | (2011.01) | |
| *H04N 21/454* | (2011.01) | |
| *H04N 21/472* | (2011.01) | |
| *H04L 65/1059* | (2022.01) | |
| *H04L 65/75* | (2022.01) | |
| *H04L 65/611* | (2022.01) | |

(52) U.S. Cl.
CPC ... *H04N 21/2387* (2013.01); *H04N 21/25833* (2013.01); *H04N 21/454* (2013.01); *H04N 21/4516* (2013.01); *H04N 21/47202* (2013.01); *H04L 65/611* (2022.05)

(58) Field of Classification Search
CPC .......... H04N 21/47202; H04L 65/1059; H04L 65/604; H04L 65/4076
See application file for complete search history.

(56) References Cited

U.S. PATENT DOCUMENTS

| | | | |
|---|---|---|---|
| 7,558,869 | B2 | 7/2009 | Leon |
| 8,028,314 | B1 | 9/2011 | Sezan et al. |
| 8,169,345 | B2 | 5/2012 | Evans et al. |
| 8,806,050 | B2 | 8/2014 | Chen et al. |
| 9,292,826 | B1 | 3/2016 | Chen et al. |
| 9,979,925 | B2 | 5/2018 | Priddle et al. |
| 10,104,143 | B1 * | 10/2018 | Li .................. H04L 67/02 |
| 10,531,095 | B2 | 1/2020 | Deen et al. |
| 2002/0013949 | A1 | 1/2002 | Hejna, Jr. |
| 2002/0047899 | A1 | 4/2002 | Son |
| 2002/0052967 | A1 | 5/2002 | Goldhor |
| 2004/0001694 | A1 | 1/2004 | Evans et al. |
| 2004/0003398 | A1 | 1/2004 | Donian et al. |
| 2004/0158870 | A1 | 8/2004 | Paxton |
| 2004/0267952 | A1 | 12/2004 | He et al. |
| 2004/0268397 | A1 | 12/2004 | Dunbar et al. |
| 2005/0172028 | A1 | 8/2005 | Nilsson et al. |
| 2006/0090009 | A1 | 4/2006 | Gopalakrishnan et al. |
| 2006/0143678 | A1 | 6/2006 | Chou |
| 2006/0218604 | A1 | 9/2006 | Riedl |
| 2006/0218607 | A1 * | 9/2006 | Hodzic ............. H04N 7/1675 725/100 |
| 2006/0256851 | A1 | 11/2006 | Wang et al. |
| 2007/0058926 | A1 | 3/2007 | Virdi et al. |
| 2008/0145031 | A1 | 6/2008 | Tanaka |
| 2008/0148327 | A1 | 6/2008 | Xu |
| 2008/0175325 | A1 | 7/2008 | Hannuksela |
| 2008/0201748 | A1 | 8/2008 | Hasek et al. |
| 2008/0235566 | A1 | 9/2008 | Carlson et al. |
| 2008/0267213 | A1 | 10/2008 | Deshpande |
| 2008/0310825 | A1 | 12/2008 | Fang et al. |
| 2009/0287841 | A1 | 11/2009 | Chapweske |
| 2010/0011402 | A1 | 1/2010 | Oshima |
| 2010/0158101 | A1 | 6/2010 | Wu et al. |
| 2011/0032999 | A1 | 2/2011 | Chen |
| 2011/0096828 | A1 | 4/2011 | Chen et al. |
| 2011/0099594 | A1 | 4/2011 | Chen |
| 2011/0129202 | A1 | 6/2011 | Soroushian |
| 2011/0231519 | A1 | 9/2011 | Luby et al. |
| 2011/0246885 | A1 * | 10/2011 | Pantos ............. H04N 21/64322 715/716 |
| 2011/0317760 | A1 | 12/2011 | Chen |
| 2011/0320628 | A1 | 12/2011 | Gutarin et al. |
| 2012/0023250 | A1 | 1/2012 | Chen |
| 2012/0023251 | A1 | 1/2012 | Pyle et al. |
| 2012/0042090 | A1 * | 2/2012 | Chen ................. H04L 65/70 709/231 |
| 2012/0110167 | A1 | 5/2012 | Joch |
| 2012/0141090 | A1 | 6/2012 | Evans et al. |
| 2012/0148216 | A1 | 6/2012 | Pavagada |
| 2012/0311094 | A1 * | 12/2012 | Biderman .......... H04N 21/8543 709/219 |
| 2013/0097309 | A1 | 4/2013 | Ma |
| 2013/0191550 | A1 | 7/2013 | Hannuksela |
| 2013/0268961 | A1 | 10/2013 | Miles et al. |
| 2014/0010282 | A1 | 1/2014 | He et al. |
| 2014/0023286 | A1 | 1/2014 | Du |
| 2014/0371888 | A1 | 12/2014 | Lundqvist |
| 2015/0067137 | A1 | 3/2015 | VerSteeg et al. |
| 2015/0373383 | A1 | 12/2015 | Pichumani et al. |
| 2016/0134673 | A1 | 5/2016 | MacInnis |
| 2016/0234518 | A1 | 8/2016 | Hendry et al. |
| 2016/0241892 | A1 * | 8/2016 | Cole .................. H04N 5/23238 |
| 2016/0337426 | A1 | 11/2016 | Shribman et al. |
| 2017/0142417 | A1 | 5/2017 | Deen et al. |
| 2017/0149858 | A1 | 5/2017 | Frojdh et al. |
| 2018/0139001 | A1 | 5/2018 | Yang et al. |

FOREIGN PATENT DOCUMENTS

| | | | |
|---|---|---|---|
| JP | 2004234157 | A | 8/2004 |
| JP | 2007043562 | A | 2/2007 |
| WO | 2008084424 | A1 | 7/2008 |

OTHER PUBLICATIONS

Sullivan, G., "Some Potential Enhancements of H.264.AVC", ITU-T Video Coding Experts Group (ITU-T SG16 Q. 6) 24th Meeting, Oct. 18-22, 2004, pp. 1-10, Palma de Mallorca.

Hannuksela, M., "Sub-stream Profile & Level Signaling", Joint Video Team (JVT) of ISO/IEC MPEG & ITU-T VCEG (ISO/IEC JTC1/SC29/WG11 and ITU-T SG16 Q.6) 12th Meeting, Jul. 19-24, 2004, pp. 1-6, Redmond, WA.

* cited by examiner

| Level number | Max macroblock processing rate MaxMBPS (MB/s) | Max frame size MaxFS (MBs) | Max decoded picture buffer size MaxDpbMbs (MBs) | Max video bit rate MaxBR (1000 bits/s, 1200 bits/s) | Max CPB size MaxCPB (1000 bits, 1200 bits) |
|---|---|---|---|---|---|
| 1 | 1 485 | 99 | 396 | 64 | 175 |
| 1b | 1 485 | 99 | 396 | 128 | 350 |
| 1.1 | 3 000 | 396 | 900 | 192 | 500 |
| 1.2 | 6 000 | 396 | 2 376 | 384 | 1 000 |
| 1.3 | 11 880 | 396 | 2 376 | 768 | 2 000 |
| 2 | 11 880 | 396 | 2 376 | 2 000 | 2 000 |
| 2.1 | 19 800 | 792 | 4 752 | 4 000 | 4 000 |
| 2.2 | 20 250 | 1 620 | 8 100 | 4 000 | 4 000 |
| 3 | 40 500 | 1 620 | 8 100 | 10 000 | 10 000 |
| 3.1 | 108 000 | 3 600 | 18 000 | 14 000 | 14 000 |
| 3.2 | 216 000 | 5 120 | 20 480 | 20 000 | 20 000 |
| 4 | 245 760 | 8 192 | 32 768 | 20 000 | 25 000 |
| 4.1 | 245 760 | 8 192 | 32 768 | 50 000 | 62 500 |
| 4.2 | 522 240 | 8 704 | 34 816 | 50 000 | 62 500 |
| 5 | 589 824 | 22 080 | 110 400 | 135 000 | 135 000 |
| 5.1 | 983 040 | 36 864 | 184 320 | 240 000 | 240 000 |

| | Speed up | Required level |
|---|---|---|
| 306: | 1x | 1.1 |
| 310: | 10x | 1.1 |
| 312: | 20x | 1.2 |
| 314: | 30x | 1.3 |

| | Operation | Speed up | Required level |
|---|---|---|---|
| 510: | Decode I only | 1x | 1.1 |
| 512: | Decode I only | 2x | 1.1 |
| 514: | Decode I & P | 2x | 1.1 |
| 516: | Omit $2^{nd}$ & $3^{rd}$ level B | 4x | 1.2 |
| 518: | Omit $3^{rd}$ level B | 8x | 2.1 |

METHOD AND ARRANGEMENT FOR SUPPORTING PLAYOUT OF CONTENT

RELATED APPLICATIONS

This application is a continuation of U.S. patent application Ser. No. 15/976,192, filed 10 May 2018, which is a continuation of U.S. patent application Ser. No. 13/007,890, filed 17 Jan. 2011 (U.S. Pat. No. 9,979,925), which claims priority to U.S. Provisional Patent Application No. 61/295,958, filed 18 Jan. 2010, and to International Patent Application No. PCT/SE2011/050033, filed 13 Jan. 2011, all of which are incorporated herein by reference in their entirety.

TECHNICAL FIELD

The invention relates to a method and an arrangement for supporting playing out content at a rate which is compliant with the level supported by a client.

BACKGROUND

The standard H.264, which is also known as MPEG-4 or AVC (Advanced Video Coding), is the state of the art video coding standard. The H.264 relates to a hybrid codec, which may eliminate redundancies between frames and/or within a frame. The output of the encoding process according to H.264 is VCL (Video Coding Layer) data which is further encapsulated into NAL (Network Abstraction Layer) units prior to transmission or storage.

The standard H.264 includes the definition of different profiles, which are denoted e.g., "Baseline profile", "Main profile" and "Extended profile". For each such profile, a set of binary capabilities of a terminal or client is defined. For example, "Main profile" includes CABAC (Context Adaptive Binary Arithmetic Coding), which is not included in "Baseline profile".

The standard H.264 further includes the definition of different "levels", which relate to e.g., the capabilities of a codec. The definition of a level includes, e.g., a maximum number of macroblocks per second, a maximum frame-size, a maximum DPB (Decoded Picture Buffer) size, and a maximum video bit rate. The different levels may be specified e.g., in a table as illustrated in FIG. 1*a*. The table in FIG. 1*a* is part of a table defining profile independent levels in the standard ISO/IEC 14496-10. When a codec fulfills all requirements, e.g., in terms of capacity, of a certain defined level, the codec could be said to support, be compliant to, or conform to, said level. A media bit stream having characteristics, e.g., in terms of frame rate and/or bit rate, within the defined limits of a certain level could be said to be compliant to, or conform to, said certain level.

Typically, the conformance of a media content or bit stream to a particular level is specified by the setting of a syntax element associated with the media content, which element may be denoted, e.g., "level_idc", to a certain value associated with said particular level.

A client can determine the complexity, or level, required for playing a certain media content by analyzing the value of said syntax element associated with a content or bit stream, and thus determine whether the client supports the playout of said certain media content. If the level required for playing the media content is equal to or below the level associated with the client, the client supports the playout of the media. If the level required for playing the media content exceeds the level associated with the client, the client may not be capable of playing the media content.

A media content located e.g., at a media server, is associated with a certain predefined regular playout rate, and it is the level required for playing out this regular playout rate that is indicated e.g., in the "level_idc". For example, when playing a movie, the regular playout rate would be the "regular speed", or "real-time speed" of the movie, such as it would be played e.g., in a movie theater or in television. The term "regular playout rate" implies that all frames types of the content are displayed, e.g. I-frames (Intra-coded frames), P-frames (Predicted frames) and B-frames (Bi-predicted frames), in case of video content.

A media bit stream may also be played in a non-regular playout rate, i.e., non-real-time playout or playback. Below, some examples of achieving faster than real-time, or "fast forward", playout of a media bit stream will be described.

The simplest method of achieving "fast forward" is to play or playout a stream at a faster rate than its original or predefined regular rate, by increasing the number of frames played out per second. This method has the drawback of increased requirements on processing power. For example, for a client to be able to fast forward a media bit stream at 10× normal speed using this method, the client must have a processing power which supports a ten times higher decoding complexity than when playing the media bit stream at the regular playout rate. The above described method of achieving faster than real-time playback or playout is illustrated in FIG. 1*b*, where sequence or stream 102*b* is played out at normal rate or speed, and sequence 104*b* is played out at 2× normal rate, i.e., twice as fast as sequence 102*b*.

Another method of achieving "fast forward", which requires less processing power than the previously described method, is to play out e.g., only the I-frames of a video media bit stream. This method could be described e.g., as "jumping between I-fames", and is illustrated in FIG. 2. In FIG. 2, the sequence or stream 202 is played out at normal rate or speed. All frames comprised in the stream or content, such as I-, P-, and B-frames are played out. In sequence 204, only the P-frames (shaded in FIG. 2) of the stream are played out, which in this case creates a "pseudo" 2× normal rate, since every second frame is played out. This method is in fact an operation on the stream rather than a real speed-up. The reduction of the number of frames to be played out reduces the required complexity or processing power of a client to a degree depending e.g., on the distance between the !-frames in the media bit stream. A drawback of this method is that the "fast forward" speed cannot be freely controlled due to e.g. I-frame distance constraints. A finer granularity of fast forward speed, e.g., fraction of I-frame distance, is not possible.

Another drawback of the method of "jumping between I-fames" is the high overhead associated with this solution. Extensive overhead may imply high bandwidth demands. The complete stream (all frames) must be sent to the receiver or client, which filters and discards the "unwanted" frames (majority of frames).

Yet another method of achieving "fast forward" is to use prior knowledge of e.g., a video stream. This knowledge could be, e.g., that a certain Group Of Picture (GOP) structure, or a fixed periodicity for key-frames, is used. This information could be used e.g., to determine which frames that could be left out when displaying the video stream.

The main problem with existing "fast forward" solutions, such as the ones described above, is that the decoding complexity of a media stream when being played in "fast forward mode", and thus the required processing capacity or level for playing out the media stream, cannot be easily acquired by a client, which is about to e.g. retrieve or request the media stream, or, which is about to start "fast forwarding" of a media stream, which is currently being downloaded.

The specified "levels" regulate the upper limits of every aspect of decoding complexity including e.g., frame size, motion vector range and max bit rate. In order to be compliant to or conform to a particular level, a media stream must conform to all the specified limits associated with the level. Consequently, some media content or streams may be categorized into a "high" level due to that e.g., only one of its characteristics has a high value, such as e.g., a large frame size. At the same time, the other characteristics of the same media stream may have "low" values, i.e., lower than the values specified for said "high" level, which actually could give that the complexity of the stream as a whole, in fact, could be rather low, and that a lower level would suffice to cope with these characteristics. An example of such a media stream could be e.g., a 2 Hz, 1280×720p sequence, which has a relatively large frame size, but a very low frame rate.

In order to reduce decoding complexity for a client, the frame rate of a video stream could be reduced at the content server, to simplify fast forwarding at the client. However, such a reduction cannot be indicated to a client, and consequently clients cannot benefit from the "help" thus provided by the server.

Further, even if a client has access to prior knowledge about the encoding of a stream, the client may not be able to deduce the decoding complexity of the stream after that e.g., a frame reducing operation has been performed in the server or in the client.

Thus, when a client is to perform "fast forward" of a media stream, the client has no way of knowing if supporting the level indicated by or for the media stream will be sufficient for decoding the media stream in "fast forward" mode. Due to this uncertainty, clients are typically equipped with and use a more powerful, somewhat "overdimensioned", decoder, to "be on the safe side". This is very inefficient, e.g., in terms of computational resources.

SUMMARY

Embodiments herein enable improved handling of the playing of media content at non-regular playout rates at a client. Further, embodiments herein provide a method and an arrangement for enabling an improved signaling of level information.

According to a first aspect, a method is provided in a client node. The method comprises obtaining information related to said certain content regarding the level requirements associated with at least one non-regular playout rate for said certain content. The method further comprises determining which playout rate(s) that is/are supported by the client node in regard of level, based on the obtained information.

According to a second aspect, an arrangement is provided in a client node. The arrangement comprises a functional unit, which is adapted to obtain information related to said certain content regarding the level requirements associated with at least one non regular playout rate for said certain content. The arrangement further comprises a functional unit, which is adapted to determine which playout rate(s) that is/are supported by the client node in regard of level, based on the obtained information.

According to a third aspect, a method is provided in a server node. The method comprises determining a level requirement associated with at least one non-regular playout rate for said certain content. The method further comprises providing information on the at least one playout rate and the associated level requirement to the client node.

According to a fourth aspect, an arrangement is provided in a server node. The arrangement comprises a functional unit, which is adapted to determine a level requirement associated with at least one non-regular playout rate for said certain content. The arrangement further comprises a functional unit, which is adapted to provide information on the at least one playout rate and the associated level requirement to the client node.

The above methods and arrangements enable the client node to determine which playout rate(s) that is/are supported by the client node in regard of required level, and thus enable the client node to refrain from decoding and playout of the content at a rate requiring a level which is not supported by the client node. This prevents "trial and error" behavior, where a client attempts and fails to decode and play out media streams at non-regular rates, which are not supported by the client. Consequently, controlled "fast forward" and "slow motion" are possible with standard decoders and with minimal modification to the stream. Further, playout such as fast forward at rates close to the limits of a standard decoder is possible, which may improve decoder resource utilization.

The above methods and arrangements may be implemented in different embodiments. In some embodiments, one or more actions may be taken at the client node in order to refrain from attempting to decode and play out the content at a rate requiring an unsupported level. Examples of such actions are e.g., a decision not to retrieve the content; the restricting of selectable playout rates; the selection of an alternative version of the content, the switching to an alternative version/representation of the content, and the selection of an alternative decoder. Naturally, the content may also be decoded and played out at a non-regular rate, which is determined to be supported by the client node.

In some embodiments the information may be provided as part of a file format structure. The information could be provided in a Media Presentation Description. Further, the information may concern a content on which an operation, such as e.g., discarding and/or inserting frames, has been performed The embodiments above have mainly been described in terms of a method. However, the description above is also intended to embrace embodiments of the arrangements, adapted to enable the performance of the above described features. The different features of the exemplary embodiments above may be combined in different ways according to need, requirements or preference.

According to yet another aspect, a computer program is provided, which comprises computer readable code means, such as computer program instructions stored in a computer-readable medium, which when executed in one or more processing units, causes any of the arrangements described above to perform the corresponding procedure according to one of the methods described above.

According to yet another aspect, a computer program product is provided, which comprises the computer program of above.

BRIEF DESCRIPTION OF THE DRAWINGS

The invention will now be described in more detail by means of exemplary embodiments and with reference to the accompanying drawings, in which.

DETAILED DESCRIPTION

Briefly described, embodiments herein relate to the communication of information related to the required decoding capacity for playing a certain media content at one or more non-regular playout rates or speeds. The communication of such information may be implemented by the definition of an attribute for media streams, which attribute indicates the level required to decode the stream if a different playout rate, in terms of frames per second, is to be used, and/or if modification of the stream is to be performed. The attribute could be specified, e.g., on top of any existing parameters, such as profile and level. Such an attribute could be applied to a regular stream, and/or could advantageously be applied e.g., to a dedicated fast forward stream or similar.

Figures 2, 3:
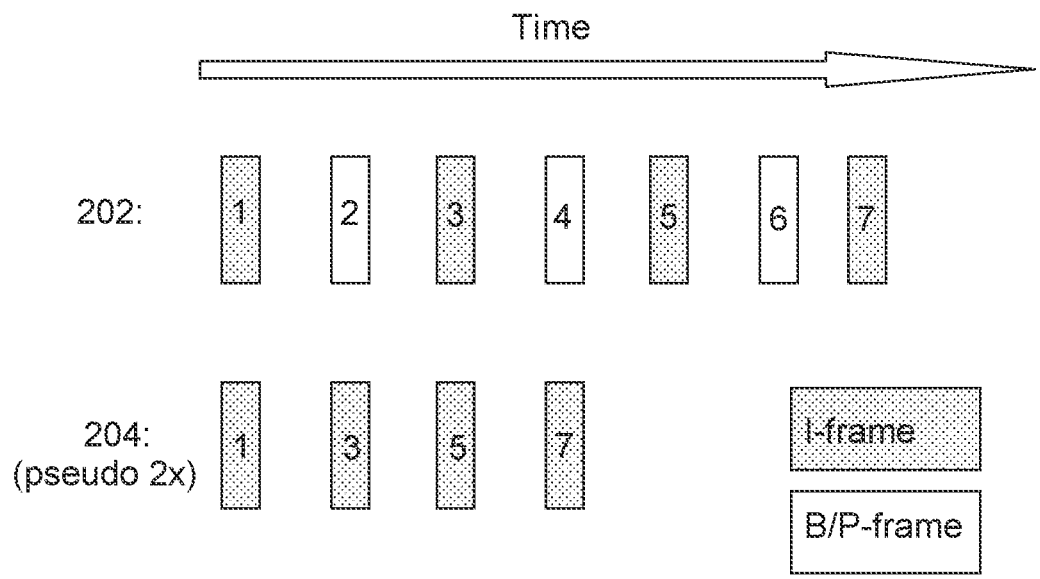
FIG. 2 is a schematic view illustrating playout of a stream on which an operation is performed, according to the prior art.
FIG. 3 is a table comprising information on which level that is required in order to playout a certain media stream at a number of different speeds, which table could be provided to a client, according to an exemplifying embodiment.

The attribute could e.g., have the form of a list or record comprising different non-regular playout rates and the corresponding required levels for a certain media content or a certain media bit stream. Such a list may comprise one or more non-regular playout rates, which require the same level as the regular playout rate of the same media content, and/or, one or more non-regular playout rates which require levels which are lower than or exceed the level associated with the regular playout rate of the media content. An example of such a list is illustrated in FIG. 3. For example, the maximal playout rate(s) associated with one or more particular levels could be provided to a client.

Further, recommendations to reduce the decoding complexity of the media content or stream by the performing of a particular operation on said content or stream, and the level required for playing out the content or stream after such an operation has been performed, may be provided e.g., to a client. This may allow for terminals or clients with lower decoder capabilities to play out or render the content or stream. Such a recommendation might be to play only every third frame of a stream, and thus reduce the frame rate by a factor three, which may require a lower level than playing out all frames.

On the server side, the standard content, i.e., the normal "non-fast forward channels" or the media object(s) intended for regular playout rate at real-time speed, may be encoded as per prior art. On top of these channels or objects, one or more dedicated fast forward channels or objects may be provided. These fast forward channels may be encoded such that the playout of said channels at increased rate or speed only requires a "reasonable" level. For example, the fast forward channels could be encoded such that a certain increase of the playout rate is supported within the same level as the one used for the regular playout rate.

Figures 1A, 1B:
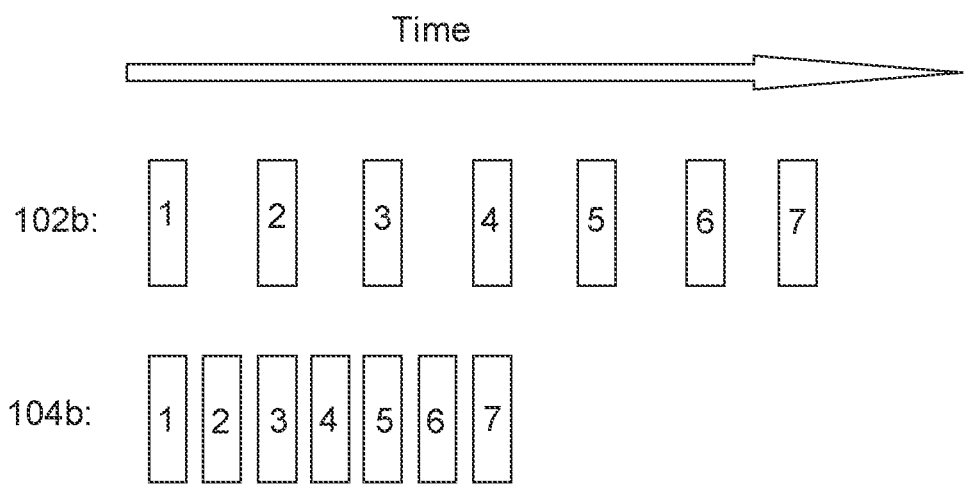
FIG. 1a is a table comprising information on limitations associated with different levels, according to the prior art.
FIG. 1b is a schematic view illustrating playout of a stream at a speed faster than "normal" or real-time speed, according to the prior art.

Within this document, the term "level" is used as referring to a level indicating a set of operational requirements for a codec, such as the ones defined in the standard H.264 and/or as illustrated in FIG. 1a, or similar requirements Below, an exemplifying embodiment relating to an HTTP (HyperText Transfer Protocol) Streaming solution providing fast forward functionality will be described. HTTP Streaming is a method of client driven, file based streaming. For instance, "Microsoft smooth streaming" is an example of HTTP Streaming. An HTTP Streaming client is provided with (e.g., by a server) a list of small files available for download, which files together make up a stream, such as e.g., a media stream. At each point in time, there may be multiple small files, i.e., different versions or representations of a content, e.g., of different bitrates/quality, that can be selected for download.

3GPP HTTP Streaming Release 9 has video support for H.264 level 1.3. H.264 level 1.3 requires e.g. (profile independent values) a maximum macroblock processing rate of 11880 MB/s and a maximal frame size of 396 MBs. Thus, in a HTTP streaming scenario in accordance to Release 9, it would be advantageous to have all "standard"/regular video streams compliant to level 1.3 or lower when played at normal speed, and any fast forward streams compliant to level 1.3 when the playback rate is increased e.g., to a predefined rate.

In order to make or provide a dedicated fast forward channel or object associated with a certain content, a number of frames could be removed from the regular version of the content, resulting in a video stream or object having a much lower frame-rate and bit rate, as compared to its equivalent "full speed" or "regular speed" alternatives. Such fast forward channels or objects could be provided without performing any additional encoding or re-encoding of the content.

These fast forward channels, which may or may not be indicated as being fast forward channels, may be associated with the signaling of one or more "level—playback rate" pairs. An example of such a fast forward channel may be a channel encoded as H.264 QVGA (Quarter Video Graphics Array, i.e., frames of 320×240 pixels) at 1 Hz.

A media stream encoded to comply with level 1.1 may require higher levels if it is to be played out at e.g., higher rates. FIG. 3 shows a table comprising information on which level 304 that is required for a certain playout rate or "speed-up" of a certain media stream or content. Such information may be provided e.g., by a media encoding entity or a media providing server to a media decoding entity, such as a client. The information comprised in entry 306 implies that playing the stream or content at normal or regular rate requires level 1.1. This is the only information that is available for a stream or content today. The information comprised in entry 310 implies that playing the stream at ten times (10×) normal rate requires level 1.1. Further, the information comprised in entry 312 implies that playing the stream at twenty times (20×) normal rate requires level 1.2. Finally, the information comprised in entry 314 implies that playing the stream at thirty times (30×) normal rate requires level 1.3.

When having access to information related to a video stream, such as the information comprised in the table in FIG. 3, a client may analyze or interpret the information, and evaluate at which rates it can playback the video stream. For example, a client compliant to level 1.1, having access to said information, can determine that the client is capable of fast forwarding the stream at 10× normal speed. Similarly, a client compliant to level 1.3 can determine that it can fast forward the same stream at 30× normal speed. These higher playout rates can be accomplished by an increase of the number of frames played per second, i.e., without any modification of the stream, such as e.g., discarding of frames.

Below, an exemplifying method of signaling of required decoder capabilities depending on stream operations, such as e.g., discarding of frames, will be described. An instruction or recommendation to modify a media stream in a certain way could be provided, e.g., from a server to a client. The instruction could be provided implicitly or explicitly. An example of such an instruction to modify a media stream could be an instruction to decode only the I-frames of the media steam. Yet another example could be an instruction to discard non-reference frames, i.e., frames which are not used as reference for the prediction of any other frame.

For example, assuming a QVGA stream encoded at 30 Hz, where every second frame is a non-reference frame. For this stream, it could be signaled, e.g., from a server to a client, that full playout (playing all frames of the stream) at regular speed would require a decoder compliant to level 1.3. However, playout of the stream after removal of the non-reference frames (i.e., every second frame) would only require a decoder compliant to level 1.2, which information could be signaled from the server to the client.

A client having access to information regarding the different levels required for playout of a stream after performance of different operations on the stream, could use this information when evaluating whether it can decode a stream or not. For example, a client with a level 1.2 decoder could determine that, through the simple operation of removing the non-reference frames of the stream, it could actually play the stream.

Below, an exemplifying embodiment combining the two methods described above will be described. In this embodiment, signaling from a server to a client of a playout speed/level-pair or combination is performed in combination with a stream processing instruction. In other words, it may be signaled from the server to the client that a certain level is required for playback of a stream at a certain non-regular rate or speed when a certain operation has been performed on the stream.

Figures 4, 5:
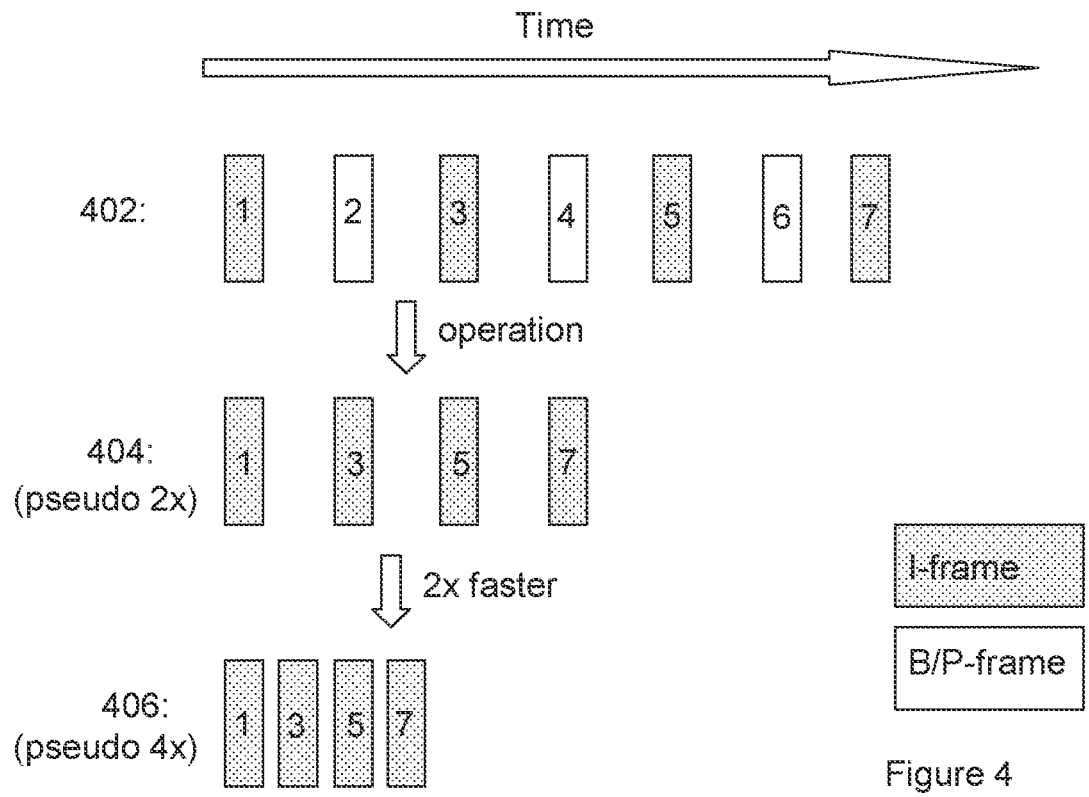
FIG. 4 is a schematic view illustrating playout of a stream, on which an operation is performed, at faster-than-normal rate.
FIG. 5 is a table comprising information on which level that is required in order to playout a certain media stream at a number of different speeds, when performing different operations on the media stream, which table could be provided to a client, according to an exemplifying embodiment.

FIG. 4 shows an example of such a combination in an exemplifying embodiment involving both an operation on a stream and a faster actual playout rate of the stream at a client when receiving the stream. The stream or sequence 402 shown in FIG. 4 is a "normal" or "complete" stream played at regular or normal rate. The stream illustrated as 402 also has an "operating point" where only the I-frames of the stream are decoded, and those I-frames are played out 2 times faster than real-time, illustrated as sequence 406. The intermediate sequence, i.e., the sequence of only I-frames, is illustrated as sequence 404. Sequence 406 appears to be played out at 4× normal rate due to the operation and 2× speed-up. This means that a single video stream, such as e.g., sequence 402, can "be", or be used as, both a fast forward stream and a normal stream, i.e., meaning that no separate fast forward stream must necessarily be prepared from a normal stream, and be made available for download at a server.

An example table, associated with a certain content or stream, comprising exemplifying information relating to an operation 502 to be performed on the stream, a playout speed increase 504, and the required level 506 for a guaranteed achievement of the operation and the speed-up, is illustrated in FIG. 5. For example, entry 510 in the table comprises information implying that when the operation of only decoding the I-frames of the stream is performed, and the I-frames are played out with the "same rate" (in terms of frames per second) as the regular playout rate of the original stream (cf. sequence 404 in FIG. 4), the level 1.1 is required. In this case, the required level 1.1 is the same level as required for playing out the normal stream or content at regular rate. Entry 512 comprises information implying that when doubling (2×) the playout rate of the "only I-frame" sequence, the required level is still 1.1. Further, entry 514 comprises information implying that when performing the operation of only decoding I-frames and P-frames of the original stream or content, and playing out the decoded frames at 2× normal playout rate, level 1.1 is required. So far, the alternatives presented may be performed by a client, which is able to play the original stream at normal rate, i.e., has at least level 1.1.

However, the information in entry 516 implies that for performing the operation of discarding or omitting $2^{nd}$ and $3^{rd}$ level B-frames, and to play out the resulting sequence at 4× normal speed, the level 1.2 is required. Further, the information in entry 518 implies that for performing the operation of omitting $3^{rd}$ level B-frames and to play out the resulting sequence at 8× normal speed, the level 2.1 is required.

Thus, from analyzing or interpreting the information comprised in the table in FIG. 5, a client (having a decoder) capable of level 1.1 can determine that the maximal non-regular playout rate supported by the client is the alternative in entry 514. A client capable of level 1.1 may further conclude that all playout rates and/or operations which require less computational power than the supported entries 510-514, are allowed alternatives for the client (at least for computational capacity reasons). A client may select one or more alternative non-regular playout rates in accordance with e.g., a predefined selection scheme or set of rules.

The exemplifying embodiments described above have been directed to "fast forward" playout of a media stream, in order to facilitate understanding of the description. However, "fast forward" is only one example amongst others of a non-regular playout rate. A media-stream could also be played out e.g., at a speed or rate which is lower or slower than real-time, also known as e.g., "slow motion". The inventive concept disclosed in this document is correspondingly applicable e.g., to such "slow motion" playout. "Slow motion" may involve the insertion of additional frames for playout, e.g., playing out each frame, or some frames, multiple times. The same type of signaling as previously described for a "fast forward"-scenario can be used to specify e.g., the required level for playing out an encoded stream at a lower-than-normal speed.

Alternative playout speeds can be signaled, e.g., to a client, in several different ways e.g., in the ISO base media file format (ISO/IEC 14496-12), or any of its derivatives, such as the 3GP file format (3GPP TS 26.244), the MP4 file format (ISO/IEC 14496-14) and the AVC file format (ISO/IEC 14496-15), encapsulating video streams.

The file format is a signaling system that provides information, such as meta data, regarding a media bit stream. Each piece of the signaled meta data is encapsulated into a container called "box", which can be nested. Different media data is referenced and organized by different "track boxes" respectively. Within each track box, there are sample entry descriptions that describe how the samples should be interpreted.

An example of how to accomplish the signaling could be that alternative speeds and corresponding profile/level indications can be provided as a table in an optional "box" or "container" within the sample entry descriptions associated with the samples of a track. The same technique can also be used to provide optional sample entry descriptions, which may contain profile/level indications for a number of different speeds. For example, an optional box could be added inside the original sample entry containing the alternative sample entry descriptions and speeds.

Another way of signaling the information is to define additional fast forward/slow motion tracks. Since these new tracks have the same content as the original track (only a faster/slower version), they can be put in the same switch group as the original track, indicating that they are 'switchable'. The alternative tracks may refer to the same video streams in the media data box as the original track, but can indicate different profiles/levels and may have different time stamps. How the time stamps are assigned controls the playback speed. This mechanism is equivalent to having a table indicating profiles/levels and alternate playout speed. By referencing the video stream from another track, frames could also be removed in order to "thin out" the stream, by just omitting them in the samples of the new track. Referencing can be done directly into the media data box, or any place where the media data is located, or indirectly with hint tracks (if hint tracks are used) or extractors in the case of H.264/AVC.

For HTTP streaming it may be advantageous to signal the alternate speeds/levels in the MPD (Media Presentation Description), also known as the "manifest file". A client may then also accurately choose between versions or representations of a content, e.g., when playing out at a higher frame rate or speed.

Figure 6:
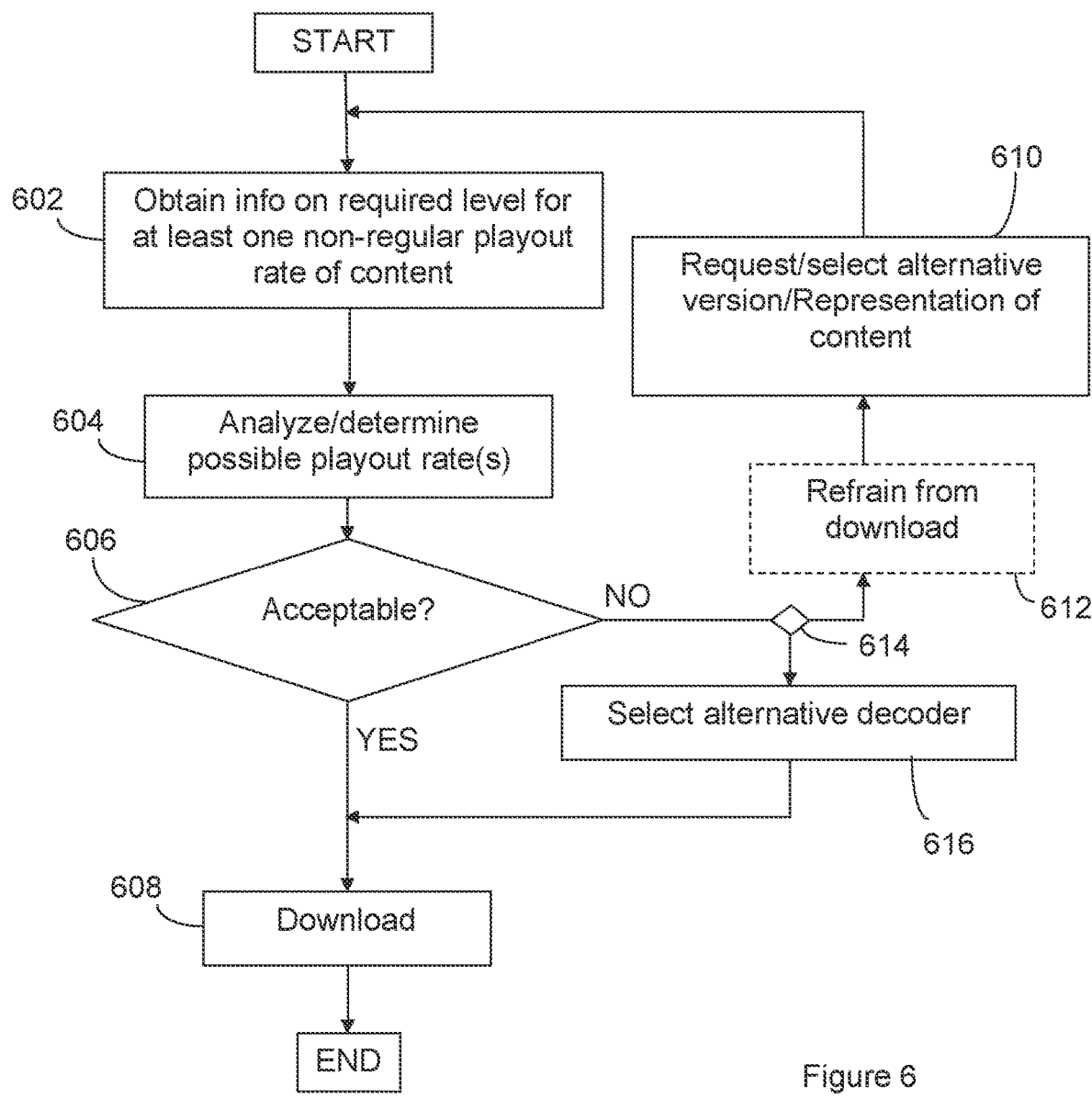
FIGS. 6-7 are flow charts illustrating procedures for supporting a decision on playout of a certain content in a client, according to exemplifying embodiments.

Example Procedure, FIG. 6

An embodiment of the procedure of supporting a decision on decoding and playout of a certain content will now be described with reference to FIG. 6. The procedure could be performed in a client node, which could be a video decoding entity, such as e.g., a set-top box, a computer or a mobile terminal.

Initially, information is obtained in an action 602. The obtained information is related to a certain content, and concerns the level requirements associated with at least one non-regular playout rate for said certain content. A non-regular playout rate is a playout rate which is different than a predefined regular playout rate. A non-regular playout rate may involve a faster or slower playout speed or rate than real-time speed or rate, and/or playing out, using the same number of frames per second as for regular real-time playout, a content on which an operation, such as e.g., discarding of certain frames, has been performed. The resulting "pseudo" playout rate, or the "perceived" playout rate, of a non-regular playout rate is not the same as for a normal stream being played out at regular rate, even though the same amount of frames per second is played out. This is valid for any of the embodiments described herein.

The content related information could comprise a list or record of non-regular rate(s), each rate being accompanied by an indication of a corresponding level which level is required for playout of the content at the non-regular rate in question. The information may further comprise indications of certain operations which may, or should, be performed on the content, such as e.g., discarding or insertion of specific frame types before playout. The information could be limited to one non-regular rate, e.g., the maximal non-regular rate which is supported or possible within the same level as the level required for real-time playout of the same content. In such a case the information on the required level could be implicit, e.g., the required level associated with the non-regular rate could be pre-agreed, or, the information could be explicit.

Further, the obtained information is analyzed or interpreted, and it is determined in an action 604 which non-regular playout rate(s) that is/are supported by the client, thus being possible for the client to use when playing out the content. For example, the maximal playout rate that is supported by the client may be determined. The non-regular playout-rate(s) subject to the determining could be one or more of the non-regular playout rate(s) indicated in the obtained information, or some other playout rate, for example a predetermined "desired" playout rate. The determining may involve a comparison between a required level indicated in the obtained information and a threshold, e.g., the level value associated with the client, and/or a generalization or interpolation of values comprised in the obtained information in order to derive information on level requirements for non-regular playout rates, which are not comprised in the obtained information.

Then, it may be determined in an optional action 606, whether the non-regular playout rate(s) supported by the client (if any) fulfill some predefined criteria. For example, it may be determined whether it would be possible for the client to play the content at a certain predetermined desired non-regular rate, e.g., ten times faster than real-time rate. Depending on the outcome of the determining of action 606, different actions may be taken. For example, if it is determined that one or more supported non-regular playout rates are acceptable or suitable according to some predefined criteria, the content in question could be downloaded by the client in an action 608, and possibly, at least partly, be played out at a non-regular rate which is supported by the client. Different possible playout rates may e.g., be indicated or "offered" to a user for selection, while no unsupported playout rates are made available for selection.

When it is determined in the action 606 that the one or more supported non-regular playout rates are not acceptable or suitable according to some predefined criterion, the client could refrain from downloading the content. The refraining from downloading is illustrated as an action 612 in FIG. 6 having a dashed outline, indicating that refraining may be passive. However, different actions may be taken in order to refrain from downloading a certain content which cannot be played out at a desired non-regular rate. For example, it could be actively decided not to download the content, or to stop downloading the content if a download has been commenced. Further, another version or representation of the content could be selected for download, which version requires a lower level for playout at a certain non-regular rate, e.g., a dedicated "fast forward" version of the content.

In case there is more than one decoder available for selection at the client, a decoder associated with a suitable higher or lower level could be selected to decode the content instead of e.g., a previously considered decoder. This is illustrated as an action 616 in FIG. 6. For obvious reasons, this alternative is only relevant when more than one decoder is available to a client, which is illustrated as a schematic determining action 614 in FIG. 6.

Figure 7:
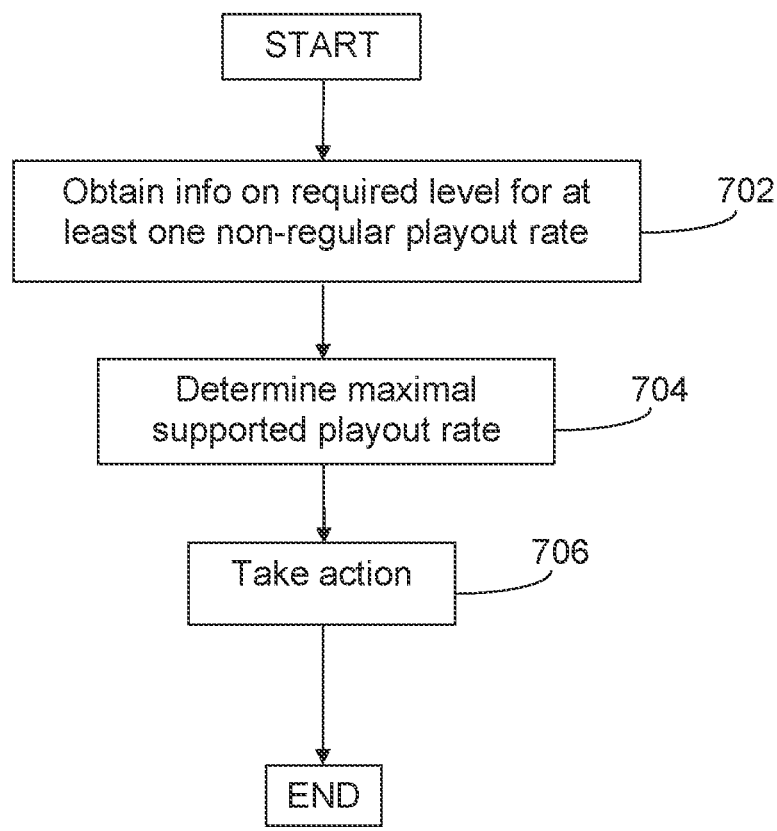

Example Procedure, FIG. 7

The exemplary procedure illustrated in FIG. 7 relates to a special case of the procedure described above with reference to FIG. 6. Information is obtained in an action 702. Then, the maximal playout rate (for the stream or content), which is supported by the client is determined in an action 704. Then, action 706 may be taken. The action 706 taken could be e.g., to play the content at the determined maximal rate, or, to set the maximal playout rate, which is selectable for a user, to the determined maximal supported playout rate.

Figure 8:
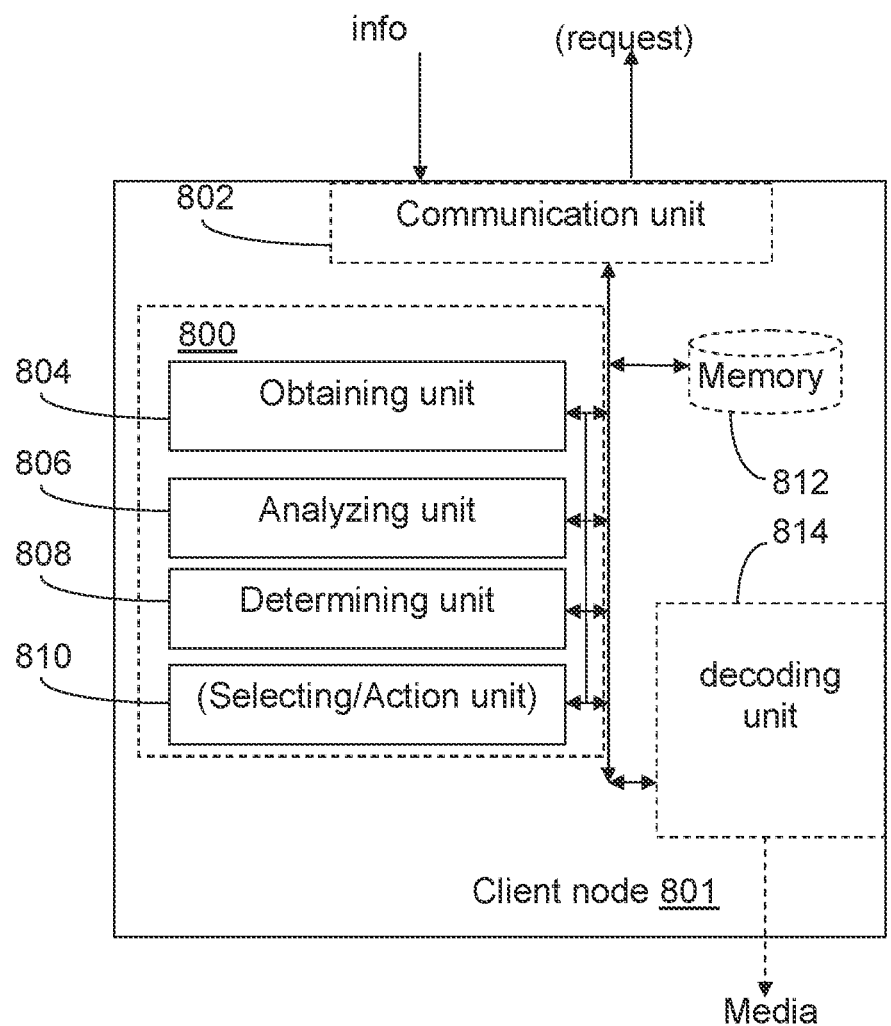
FIG. 8 is a block diagram illustrating an arrangement in a client for supporting a decision on playout of a certain content in the client, according to an exemplifying embodiment.

Exemplifying Arrangement, FIG. 8

Below, an example arrangement 800, adapted to enable the performance of the above described procedures related to supporting a decision on decoding and playout of a certain content, will be described with reference to FIG. 8. The arrangement is illustrated as being located in a client node 801 in a communication system. The client node could be e.g., a video decoding entity, such as e.g. a set-top box, a computer or a mobile terminal. The arrangement 800 is further illustrated as to communicate with other entities via a communication unit 802 which may be considered to comprise conventional means for wireless and/or wired communication. The arrangement or client node may further be assumed to comprise other functional units, such as e.g. a decoding unit 814, for decoding of e.g. a retrieved media stream; and one or more storage units 814.

The arrangement 800 comprises an obtaining unit 804, adapted to obtain information related to a certain content, which information relates to the level requirements associated with at least one non-regular playout rate for said certain content. The arrangement further comprises a determining unit 808, adapted to determine, based on the obtained information, which playout rate(s) that is/are supported by the client node in regard of level, thus enabling refraining from playout of the content at a non-regular rate requiring a level which is not supported by the client node. The arrangement may comprise an analyzing unit 806, adapted to analyze or interpret the obtained information, e.g., compare obtained level-related values to predefined threshold values, and/or determine the maximal (or minimal) playout rate supported by the client, as an alternative to that any required analysis is performed by the determining unit. The analyzing unit may provide processed information to the determining unit to facilitate decisions for the latter.

The arrangement, e.g., the determining unit 808, may further be adapted to determine whether the non-regular playout rate(s) determined to be supported by the client (if any) fulfill some predefined criteria, and may further be adapted to, based on the outcome of the determining, perform different actions, or provide instructions for different actions to be taken.

The arrangement may further comprise a functional unit 810, which may be adapted to take action in accordance with a result of a determining or according to provided instructions. Actions which may be taken are e.g., that it could be decided not to retrieve the content, an alternative version or representation of the content could be requested and/or downloaded (including switched to), or, the non-regular playout rates selectable for a user may be restricted. Further, an alternative decoder could be selected and/or requested for decoding of the content, if such alternative decoders are available. For example, the decoding unit 814 may comprise two or more conventional decoders of different levels. Another action which may be taken is to play out the content at a non-regular rate, which is supported by the client.

Figure 9:
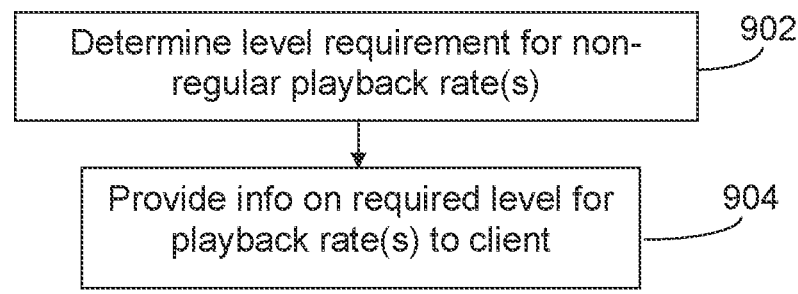
FIG. 9 is a flow chart illustrating a procedure in a server for supporting a decision on playout of a certain content in a client, according to an exemplifying embodiment.

Example Procedure, FIG. 9

An exemplifying embodiment of another aspect of the procedure of supporting a decision on playout of a certain content will now be described with reference to FIG. 9. The procedure could be performed in a server node, such as e.g., a computer or a mobile terminal. The server is assumed to provide content, which may have been encoded by the server or by some other entity, e.g. a media encoding entity.

Initially, a level requirement associated with at least one non-regular playout rate for said certain content is determined in an action 902. That is, the level requirement(s) of one or more non-regular playout rates is/are determined. The level requirement may be determined or retrieved e.g., by inspection of the content or of meta-data associated with the content, or, be calculated in conjunction with encoding of the content in the server. For example, information such as the one exemplified in one or more entries in the tables illustrated in FIGS. 3 and 5 could be determined. Then, the determined information is provided to the client in an action 904, thus enabling the client node to determine which playout rate(s) that is/are supported by the client node in regard of required level, and thus refrain from decoding and playout of the content at a rate requiring a level which is not supported by the client node.

The information, in form of e.g., a record or table, could be provided e.g., as part of a file format structure, such as an optional box or container in an appropriate position and/or in an appropriate hierarchical level of the file format structure. The information could be provided as part of the MPD, in case of e.g., HTTP streaming. The information may concern the content when a certain operation has been performed on the content, such as e.g., discarding and/or inserting frames.

Figure 10:
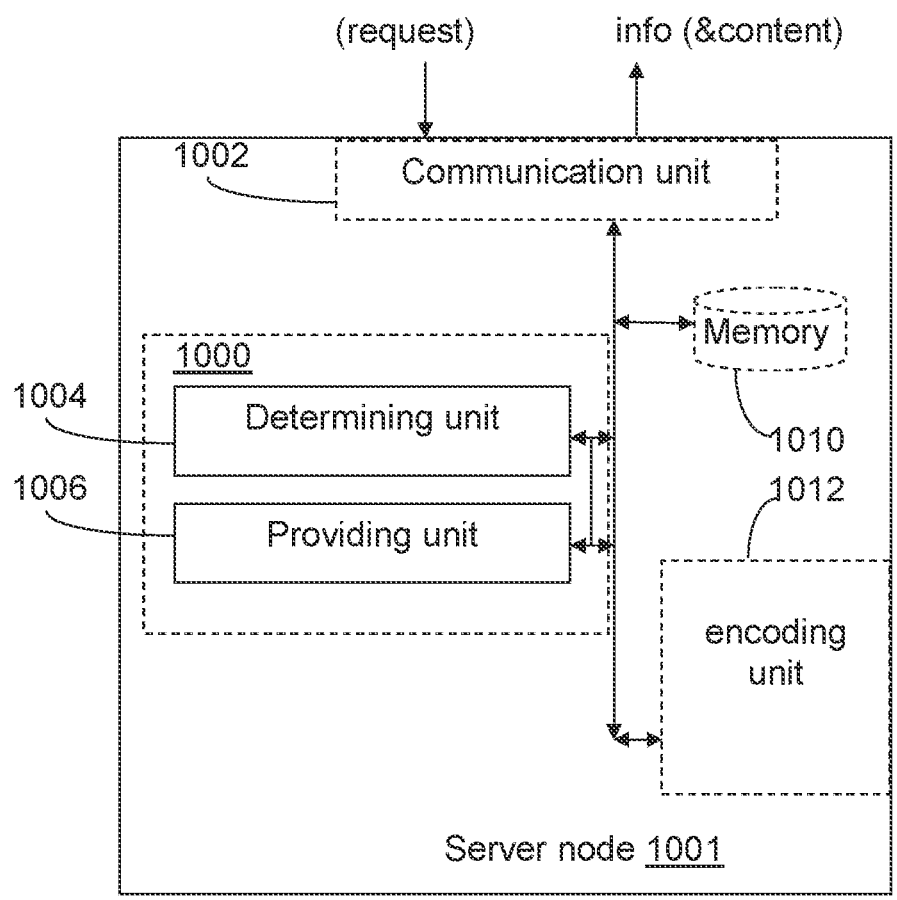
FIG. 10 is a block diagram illustrating an arrangement in a server for supporting a decision on playout of a certain content in a client, according to an exemplifying embodiment.

Exemplifying Arrangement, FIG. 10

Below, an example arrangement 1000, adapted to enable the performance of the above described procedure related to the server side of supporting a decision on playout of a certain content in a client, will be described with reference to FIG. 10. The arrangement is illustrated as being located in a server node 1001 in a communication system. The sever node could be e.g., a computer or a mobile terminal.

The server node is assumed to provide content, which may have been encoded by the server node or by some other entity, e.g. a media encoding entity. The arrangement 1000 is further illustrated as to communicate with other entities via a communication unit 802 which may be considered to comprise conventional means or modules for wireless and/or wired communication, and which may or may not be considered as a part of the arrangement 1000. The arrangement and/or server node may further be assumed to comprise other functional units, such as e.g. an encoding unit 1014, for encoding of e.g. media content; and one or more storage units 1014.

The arrangement 1000 comprises a determining unit 1004, which is adapted to determine a level requirement associated with at least one non-regular playout rate for said certain content. As previously described, the determining may involve e.g., inspection of the content and/or of meta-data associated with the content, or, calculations in conjunction with encoding of the content in the server. The information may concern the content when a certain operation has been performed on the content, such as e.g., the discarding and/or inserting of frames.

The arrangement 1000 further comprises a providing unit, which is adapted to provide information on the at least one playout rate and the associated level requirement to the client node, thus enabling the client node to determine which playout rate(s) that is/are supported by the client node in regard of required level, and thus refrain from decoding and playout of the content at a rate requiring a level which is not supported by the client node. The providing may involve inserting the information into a file format structure, such as inserting it into an optional box or container in an appropriate position and/or in an appropriate hierarchical level of the file format structure, where it may be retrieved by a client. The information could be provided as part of the MPD, in case of e.g., HTTP streaming.

Figure 11:
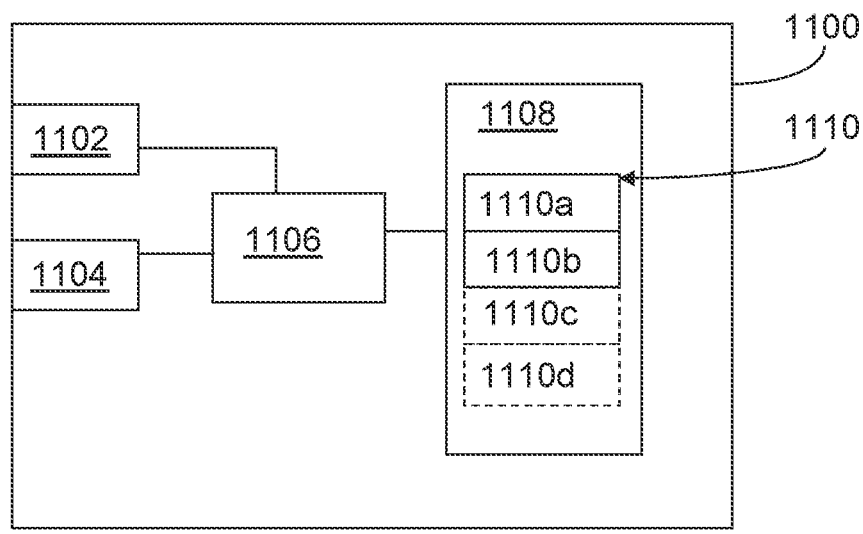
FIG. 11 is a schematic view illustrating an arrangement in a client (or server), according to an exemplifying embodiment.

Example Arrangement, FIG. 11

FIG. 11 schematically shows an embodiment of an arrangement 1100 in a client node, which also can be an alternative way of disclosing an embodiment of the arrangement in a client node illustrated in FIG. 8. Comprised in the arrangement 1100 are here a processing unit 1106, e.g., with a DSP (Digital Signal Processor). The processing unit 1106 can be a single unit or a plurality of units to perform different actions of procedures described herein. The arrangement 1100 may also comprise an input unit 1102 for receiving signals from other entities, and an output unit 1104 for providing signal(s) to other entities. The input unit 1102 and the output unit 1104 may be arranged as an integrated entity.

Furthermore, the arrangement 1100 comprises at least one computer program product 1108 in the form of a non-volatile memory, e.g., an EEPROM (Electrically Erasable Programmable Read-Only Memory), a flash memory and a hard drive. The computer program product 1108 comprises a computer program 1110, which comprises code means, which when executed in the processing unit 1106 in the arrangement 1100 causes the arrangement and/or the client node to perform the actions of the procedures described earlier in conjunction with FIGS. 6 and 7.

The computer program 1110 may be configured as a computer program code structured in computer program modules. Hence in the example embodiments described, the code means in the computer program 1110 of the arrangement 1100 comprises an obtaining module 1110a for obtaining information related to a certain content regarding the level requirements associated with at least one non-regular playout rate for said certain content. The computer program further comprises a determining module 1110b for determining, based on the obtained information, which playout rate(s) that is/are supported by the client node in regard of level. The computer program 1110 may further comprise further modules, e.g. 1110c for analyzing the obtained information and/or 1110d for taking different actions based on the information.

The modules 1110a-d could essentially perform the actions of the flows illustrated in FIGS. 6 and 7, to emulate the arrangement in a client node illustrated in FIG. 8. In other words, when the different modules 1110a-d are executed in the processing unit 1106, they correspond to the units 804-810 of FIG. 8.

Similarly and analogously, a corresponding alternative to the arrangement illustrated in FIG. 10 is possible, comprising program modules for determining and providing information.

Although the code means in the embodiment disclosed above in conjunction with FIG. 11 are implemented as computer program modules which when executed in the processing unit causes the arrangement and/or client node (or server node) to perform the actions described above in the conjunction with figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product comprises a computer readable medium on which the computer program is stored. For example, the computer program product may be a flash memory, a RAM (Random-access memory) ROM (Read-Only Memory) or an EEPROM, and the computer program modules described above could in alternative embodiments be distributed on different computer program products in the form of memories within the client node (or server node).

While the procedure as suggested above has been described with reference to specific embodiments provided as examples, the description is generally only intended to illustrate the inventive concept and should not be taken as limiting the scope of the suggested methods and arrangements, which are defined by the appended claims. While described in general terms, the methods and arrangements may be applicable e.g., for different types of communication systems, using commonly available communication technologies, such as e.g., GSM/EDGE, WCDMA or LTE or broadcast technologies over satellite, terrestrial, or cable e.g., DVB-S, DVB-T, or DVB-C, but also for storage/retrieval of media to/from memory.

It is also to be understood that the choice of interacting units or modules, as well as the naming of the units are only for exemplifying purpose, and client and server nodes suitable to execute any of the methods described above may be configured in a plurality of alternative ways in order to be able to execute the suggested process actions.

It should also be noted that the units or modules described in this disclosure are to be regarded as logical entities and not with necessity as separate physical entities.

The invention claimed is:

1. A client device for rendering a media stream received from a media server over a communication network, the client device comprising:
communication circuitry configured for communication with the media server over the communication network;
a decoder configured for decoding the media stream received from the media server; and
processing circuitry configured to:
receive, from the media server, level information associated with the media stream, the level information comprising at least one non-regular playout rate for rendering the media stream and a level requirement for decoding the media stream at the non-regular playout rate; and
determine, based on the level information, whether the at least one non-regular playout rate is supported by the decoder.

2. The client device of claim 1 wherein the level information further comprises, for the at least one non-regular playout rate, a stream operation to be performed on the media stream by the decoder to render the media stream at the non-regular playout rate.

3. The method of claim 2 wherein the stream operation comprises removing one or more frames from the media stream.

4. A media server for streaming media content to client devices over a communication network, the media server comprising:
  communication circuitry configured for communication with client devices over the communication network;
  encoder configured for encoding media streams delivered to one or more client devices over the communication network; and
  processing circuitry configured to:
    determine level information associated with a media stream made available by the media server, the level information comprising at least one non-regular playout rate for rendering the media stream and a level requirement for decoding the media stream at the non-regular playout rate; and
    send the level information to a media client to enable the media client to determine whether the non-regular playout rate is supported by a decoder at the client device.

5. The media server of claim 4 wherein the level information further comprises, for the at least one non-regular playout rate, a stream operation to be performed on the media stream by a decoder to render the media stream at the non-regular playout rate.

6. The media server of claim 5 wherein the stream operation comprises removing one or more frames from the media stream.

* * * * *

UNITED STATES PATENT AND TRADEMARK OFFICE
CERTIFICATE OF CORRECTION

PATENT NO. : 11,553,154 B2
APPLICATION NO. : 17/205827
DATED : January 10, 2023
INVENTOR(S) : Priddle et al.

Page 1 of 2

It is certified that error appears in the above-identified patent and that said Letters Patent is hereby corrected as shown below:

In the Specification

In Column 1, Line 7, delete "2018," and insert -- 2018 (U.S. Pat, No. 10,958,867), --, therefor.

In Column 2, Line 8, delete "frames types" and insert -- frame types --, therefor.

In Column 2, Line 34, delete "I-fames"," and insert -- I-frames", --, therefor.

In Column 2, Line 45, delete "!-frames" and insert -- I-frames --, therefor.

In Column 2, Line 51, delete "I-fames"" and insert -- I-frames" --, therefor.

In Column 3, Line 15, delete "give that the" and insert -- give the --, therefor.

In Column 3, Line 59, delete "non regular playout rate" and insert -- non-regular playout rate --, therefor.

In Column 4, Line 42, delete "performed" and insert -- performed. --, therefor.

In Column 6, Line 7, delete "factor three," and insert -- factor of three, --, therefor.

In Column 6, Line 23, delete "requirements" and insert -- requirements. --, therefor.

In Column 7, Line 33, delete "media steam." and insert -- media stream. --, therefor.

In Column 8, Line 67, delete "forward"-scenario" and insert -- "forward" scenario --, therefor.

In Column 9, Line 10, delete "meta data," and insert -- metadata, --, therefor.

In Column 9, Line 11, delete "meta data" and insert -- metadata --, therefor.

Signed and Sealed this
Fifth Day of December, 2023

Katherine Kelly Vidal
*Director of the United States Patent and Trademark Office*

CERTIFICATE OF CORRECTION (continued)
U.S. Pat. No. 11,553,154 B2

In Column 10, Line 28, delete "playout-rate(s)" and insert -- playout rate(s) --, therefor.

In Column 11, Line 36, delete "storage units 814." and insert -- storage units 812. --, therefor.

In Column 11, Lines 62-63, delete "functional unit 810," and insert -- Selecting/Action unit 810, --, therefor.

In Column 12, Line 22, delete "meta-data" and insert -- metadata --, therefor.

In Column 12, Line 33, delete "in form" and insert -- in the form --, therefor.

In Column 12, Lines 48-49, delete "sever node" and insert -- server node --, therefor.

In Column 12, Line 54, delete "communication unit 802" and insert -- communication unit 1002 --, therefor.

In Column 12, Line 59, delete "encoding unit 1014," and insert -- encoding unit 1012, --, therefor.

In Column 12, Lines 60-61, delete "storage units 1014." and insert -- storage units 1010. --, therefor.

In Column 12, Line 66-67, delete "meta-data" and insert -- metadata --, therefor.

In Column 13, Line 5, delete "providing unit," and insert -- providing unit 1006, --, therefor.

In Column 13, Line 12, delete "providing may" and insert -- providing unit may --, therefor.

In Column 13, Line 55, delete "further modules," and insert -- modules, --, therefor.

In Column 14, Line 21, delete "memory) ROM" and insert -- memory), ROM --, therefor.

In the Claims

In Column 15, Line 6, in Claim 3, delete "The method of claim" and insert -- The client device of claim --, therefor.